United States Patent
Kondo et al.

(10) Patent No.: US 6,668,129 B2
(45) Date of Patent: Dec. 23, 2003

(54) OPTICAL FIBER WIRING BOARD HAVING AN EXTENSION PORTION

(75) Inventors: Katsuaki Kondo, Itami (JP); Kazuo Imamura, Itami (JP); Minoru Yoshida, Itami (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 0 days.

(21) Appl. No.: 10/053,556

(22) Filed: Jan. 24, 2002

(65) Prior Publication Data

US 2002/0110342 A1 Aug. 15, 2002

(30) Foreign Application Priority Data

Jan. 24, 2001 (JP) .................................... P. 2001-015159

(51) Int. Cl.7 ................................................ G02B 6/00
(52) U.S. Cl. ...................................... 385/137; 385/135
(58) Field of Search ................................ 385/135, 137, 385/130

(56) References Cited

U.S. PATENT DOCUMENTS

| | | | | | |
|---|---|---|---|---|---|
| 5,109,460 A | * | 4/1992 | Baek et al. | .................. | 385/115 |
| 5,204,925 A | * | 4/1993 | Bonanni et al. | ............... | 385/89 |
| 5,235,658 A | * | 8/1993 | Dragone et al. | ............... | 385/50 |
| 5,239,609 A | * | 8/1993 | Suteri | .......................... | 385/136 |
| 5,937,133 A | * | 8/1999 | Moss et al. | ................... | 385/137 |
| 6,101,306 A | * | 8/2000 | Engstrand et al. | ........... | 385/137 |
| 6,321,019 B1 | * | 11/2001 | Shibuya et al. | .............. | 385/137 |
| 6,381,396 B1 | * | 4/2002 | Grois et al. | .................. | 385/137 |
| 6,416,232 B1 | * | 7/2002 | Sasaki et al. | ................. | 385/55 |
| 6,445,866 B1 | * | 9/2002 | Clairadin et al. | ............ | 385/137 |
| 2002/0102088 A1 | * | 8/2002 | Kondo et al. | ................ | 385/134 |

FOREIGN PATENT DOCUMENTS

JP  2574611 B2  10/1996

OTHER PUBLICATIONS

Patent Abstract of Japan, 07–281052, Oct. 27, 1995.

* cited by examiner

Primary Examiner—Lynn Feild
Assistant Examiner—Hae Moon Hyeon
(74) Attorney, Agent, or Firm—Sughrue Mion, PLLC

(57) ABSTRACT

An optical fiber board has a substrate, optical fiber arranged as wiring on the substrate, and extension portions in each of which some optical fibers are led out from the substrate to be adjacent to each other in a row. The adjacent optical fibers at a base portion of the extension portion are not fixed to one another. The adjacent optical fibers at a forward end portion of the extension portion are fixed to one another integrally. The base portion has a predetermined length from an edge portion of the substrate.

10 Claims, 8 Drawing Sheets

OPTICAL FIBER WIRING BOARD HAVING AN EXTENSION PORTION

BACKGROUND OF THE INVENTION

1. Field of the Invention

The present invention relates to an optical fiber wiring board for optically connecting optical elements, optical circuits or optical devices to each other.

2. Description of the Related Art

Improvement of transmission rate has been intended in the inside of communication apparatus and computers in recent years. Examination of optical interconnection substituted for electric wiring heretofore used has been advanced for high-rate transmission. At present, a proposal has been made on an optical fiber wiring board in which a large number of optical fibers are arranged as wiring in a backboard or in a plug-in unit so as to be integrated into the form of a board. Such an optical fiber wiring board generally is formed as follows: A large number of optical fibers are arranged as wiring on a sheet-like substrate provided with an adhesive layer. Then, at least one optical fiber is led out at a predetermined position from an edge portion of the substrate. When a plurality of optical fibers are led out at the predetermined position, they are led out in a condition that they are horizontally arranged in a row. Finally, connectors are attached to the ends of the optical fibers thus led out.

As a structure of leading out the optical fibers, a following configuration has been disclosed in Japanese Patent No. 2574611. That is, tab portions in form of protrusion portions are provided on optical fiber leading-out portions of the substrate so that optical fibers are extended out along the tab portions. In this configuration, the optical fiber leading-out portions can be mechanically reinforced with the tab portions. Moreover, the optical fibers extended out from the substrate can be pulled around when the tab portions are curved in a direction vertical to the plane of the substrate or twisted. Therefore, there is an advantage that degree of freedom in points of connection of connectors is increased.

In the configuration, the degree of freedom for curving the tab portions in a direction vertical to the plane of the substrate is obtainable. However, the tab portions cannot be curved in a left-right direction with respect to a direction in which the tab portions are protruded out from the substrate because the tab portions protruded out from the substrate are formed integrally with the substrate. There is a disadvantage that the degree of freedom is limited when optical fibers are pulled around from the optical fiber leading-out portion in a direction horizontal to the plane of the substrate and connected by connectors connected thereto. Further, the tab portions are twisted so that the optical fibers can have the proper orientation with respect to a direction in which the optical fibers are led out. That is, the optical fibers themselves are twisted along the optical fiber leading-out direction by at a predetermined angle, so that orientation of the connecters connected to the optical fibers can be adjusted so as to match with connectors connected to an equipment to be mounted (hereinafter referred as equipment-side connectors). However, since the tab portions are formed integrally with the substrate, the degree of freedom allowed to twist the tab portions is limited. For example, it is difficult to twist the tab portions at 90° or 180° relative to a body portion of the substrate. Further, there is a disadvantage that the optical fibers cannot be maintained in the twisted shape. Moreover, when the optical fibers are maintained in the twisted shape over a long period of time, since the optical fibers themselves are twisted substantially, the stress depending on the elasticity of optical fibers is applied on end portions of the optical fibers or base portions of the tab portions. Particularly, when the optical fibers are led out in the condition that a plurality of optical fibers are horizontally arranged closely to one another in a row, the degree of freedom allowed to bend the optical fibers in the left-right direction or twist the optical fibers without increase of loss or damage in the optical fibers in the extension portion is limited extremely.

SUMMARY OF THE INVENTION

Therefore, an object of the invention is to provide an optical fiber wiring board having an optical fiber leading-out structure in which a bundle of optical fibers led out from a substrate can be pulled around freely in a direction horizontal to the plane of the substrate as well as in a direction vertical to the plane of the substrate, in which the optical fibers are freely orientated with respect to a direction in which the optical fibers are led outs and in which the optical fibers extended out from the substrate can be mechanically reinforced sufficiently.

In order to accomplish the object above, the following means are adopted. According to the invention, there is provided an optical fiber wiring board comprising: a substrate; a plurality of optical fibers arranged as wiring on the substrate; and extension portions, each including a base portion having a predetermined length front an edge portion of the substrate, and a forwarding end portion connected to a side of the base portion opposing the substrate; wherein each of the extension portions also includes some optical fibers disposed adjacent to one another, wherein the some optical fibers at the base portion are not fixed relative to one another whereas the some optical fibers at the forward end portion are fixed relative to one another integrally.

In the optical fiber wiring board, it is preferable that the some optical fibers in each of the extension portions are led out from the substrate closely to one another in a row in a horizontal direction, and wherein the some optical fibers at the forward end portion are integrated so that the some optical fibers are arranged adjacent to one another in a row. Preferably, the optical fibers at the forward end portion maybe integrated so that the some optical fibers are aligned in a tape-like shape and wherein the integrated optical fibers at the forward end portion may be aligned non-parallel to the substrate.

In such a configuration, a bundle of the optical fibers at the base portion can be curved freely because the optical fibers at the base portion are not fixed to one another but made free. Accordingly, the optical fibers led out from the substrate can be pulled around freely in directions horizontal and oblique to the plane of the substrate as well as in a direction vertical to the plane of the substrate. On the other hand, the bundle of the optical fibers at the forward end portion is not separated into pieces because the optical fibers at the forward end portion are integrally fixed relative to one another, for example, to form a tape-like shape. Moreover, the state of arrangement of the optical fibers in the portion in which the optical fibers are led out from the substrate is not disordered.

Further, in the optical fiber wiring board, it is preferable that the optical fibers at the forward end portion are integrated so that the some optical fibers are aligned in a tape-like shape and aligned non-parallel to the substrate while each of the optical fibers is not twisted about its center axis.

In such a configuration, a bundle of the optical fibers at the base portion can be curved freely because the optical fibers at the base portion are not fixed relative to one another but made free. Accordingly, the optical fibers led out from the substrate can be pulled around freely in directions horizontal and oblique to the plane of the substrate as well as in a direction vertical to the plane of the substrate. Further, in the extension portions, the proper orientation of the optical fibers is maintained because the optical fibers at the forward end portion are integrated so that the some optical fibers are aligned non-parallel to the substrate while each of the optical fibers is not twisted about its center axis is maintained. Therefore, even if the orientation of connectors of optical fibers need to be adjusted in accordance with the equipment-side connectors, the optical fiber wiring board can be easily mounted on the equipment to be mounted. That is, when the connectors of optical fibers are connected with the equipment-side connectors in such a condition that they have an angle relative to the plane of the substrate, the connectors of the optical fibers can be easily connected with the equipment-side connectors.

The above-mentioned optical fiber wiring board preferably further comprises a protective tube protecting at least at the base portion of each of the extension portions; and a lock portion provided in the edge portion of the substrate for locking one end portion of the protective tube relative to the substrate. In this case, preferably, the lock portion includes notch portions formed at portions in the substrate, between which the some optical fibers are extended out from the edge portion of the substrate, wherein the one end portion of the protective tube is fitted and locked to the notch portions. In this configuration, the base portion is protected by the protective tube, so that the mechanical strength of the base portion can be reinforced in a state in which the bundle of optical fibers is separated into pieces. Hence, damage can be avoided when the optical fibers led out are pulled around.

Further, the above-mentioned optical fiber wiring board, preferably further comprises a skin layer covering the forward end portion of each of the extension portions: a first protective tube for protecting at least the base portion of each of the extension portions; a second protective tube for covering the first protective tube and covering an exposed portion of the plurality of optical fibers reaching the skin layer; and a lock portion provided in the edge portion of the substrate for locking one end portion of the first and second protective tubes relative to the substrate. In this configuration, there is an advantage that the optical fiber leading-out portion can be protected over the whole length by the second protective tube in accordance with the outer diameter of the skin layer. Moreover, there is an advantage that the base portion can be protected by the first protective tube.

A heat-shrinkable tube is preferably used as the protective tube. In this case, the heat-shrinkable tube may be heat-shrunk after one end portion of the heat-shrinkable tube is fitted into the lock portion of the substrate. After heat shrinking, the tube is made thin in the portion locked to the substrate. Hence, a level difference between the tube and the substrate is reduced. Moreover, the adhesive property between the inside of the tube and the substrate/optical fiber is made good. Hence, tolerance to dropout is preferably improved.

DETAILED DESCRIPTION OF THE INVENTION

Embodiments of the invention will be described below with reference to the drawings.

Figure 1:
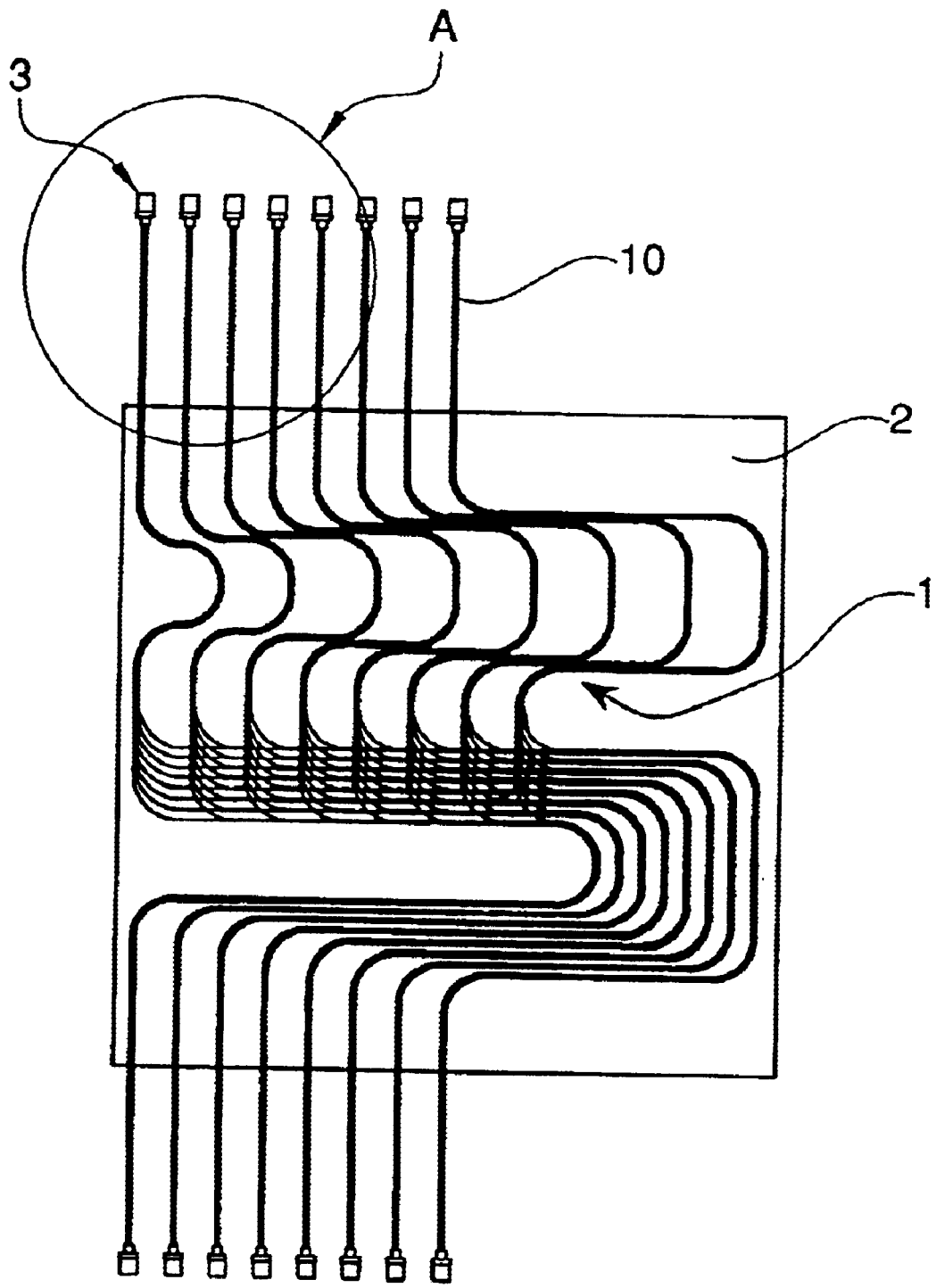
FIG. 1 is a plan view showing an example of an optical fiber wiring board.

FIG. 1 is a plan view showing an optical fiber wiring board according to an embodiment of the invention. A large number of optical fibers 1 formed as a desired pattern are bonded/fixed onto a substrate 2. End portions of the optical fibers 1 are led out one by one or bundle by bundle from the substrate 2. The portions in which the optical fibers 1 are led out from the substrate 2 form extension portions 10. Incidentally, connectors 3 are attached to end portions of the extension portions 10 of the optical fibers respectively. The connectors 3 are provided to be connected to connectors connected to an equipment to be mounted (hereinafter referred as equipment-side connectors) respectively when the optical fiber wiring board is mounted on the equipment.

Figure 2:
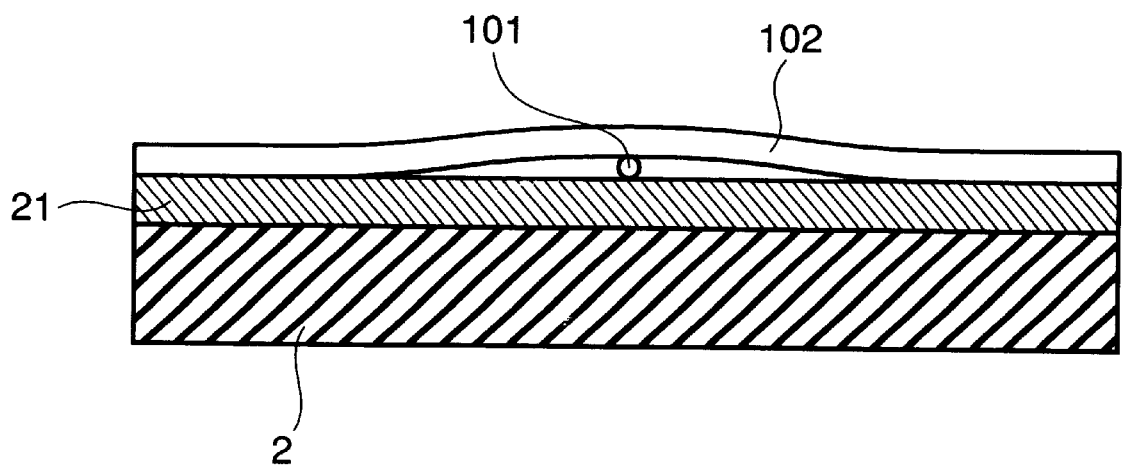
FIG. 2 is a sectional view showing a portion of intersection between optical fibers in the optical fiber wiring board according to the invention.

FIG. 2 is an enlarged sectional view showing a state of adhesion between each optical fiber 1 and the substrate 2. To describe it in detail, optical fibers 101 and 102 are arranged as wiring on an adhesive layer 21 which is provided on the substrate 2 made of a resin sheet. Incidentally, FIG. 2 shows a portion of intersection between optical fibers arranged as wiring and shows a state in which one optical fiber 102 is laid across the other optical fiber 101. In such a configuration;, a material strongly tolerant to vibration may be preferably used as the substrate 2 so that optical fibers laid thereon are hardly bent. For example, a resin sheet made of a polyimide resin, a polyethylene terephthalate resin, a polyethylene naphthalate resin and so on can be used as the substrate 2. Any material may be used as the adhesive layer 21 if the material has bonding or adhesive property sufficient to fix optical fibers steadily. For example, the adhesive layer 21 can be made of a silicone adhesive agent.

For example, an optical fiber wiring board is produced by a following method. That is, a wiring apparatus provided with a wiring head having an optical fiber supply unit is used. An optical fiber is paid out from the head onto the substrate 2 so that a predetermined pattern is drawn while the optical fiber is bonded to the adhesive layer 21. The optical fiber is laid into a form as if the form is drawn with a single stroke of a pen, via routes protruded out from edges of the substrate 2. Then, the optical fiber is cut at portions protruded out from the substrate 2, so that the extension portions 10 of optical fibers are formed. Finally, connectors 3 are then attached to end portions of the extension portions 10 respectively, so that the optical fiber wiring board is completed. The invention applies an idea to the structure of the extension portions 10.

Figure 3:
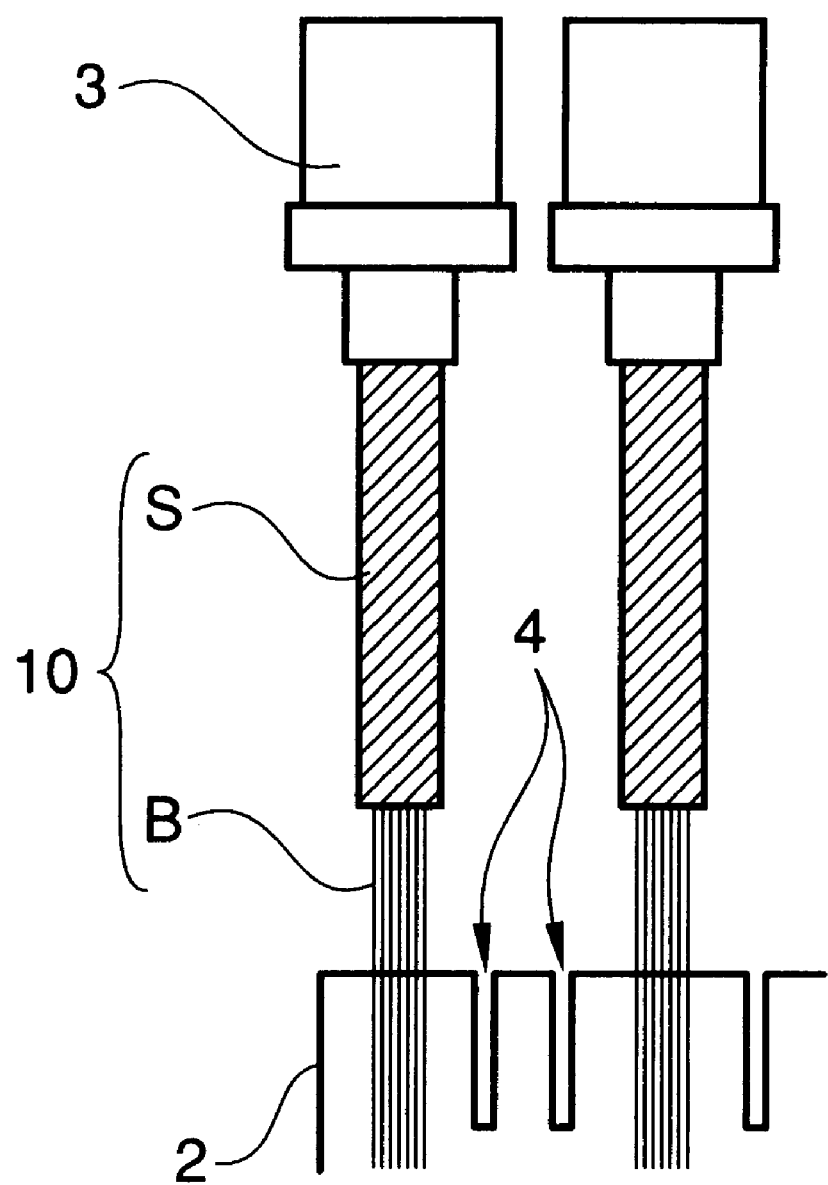
FIG. 3 is an enlarged plan view showing important part (portion A in FIG. 1) of optical fiber extension portions in the optical fiber wiring board according to the invention.

FIG. 3 is an enlarged view showing the extension portions 10 (portion A in FIG. 1) in the invention. The optical fibers are led out from the substrate 2 in the condition that about five optical fibers per port are horizontally arranged closely and adjacently to one another in a row. Of course, this does not means that the case where optical fibers are arranged, for example, in two rows is excluded, or the case where optical fibers are arranged not closely to one another is excluded. The arrangement where optical fibers are horizontally arranged closely to one another in a row is, however, preferred from the point of view of attachment property of connectors and space saving and from the point of view of efficiency in integrally fixing optical fibers in one another as will be described later. At the base portion B of the extension portion 10 of optical fibers led out in such a manner, adjacent optical fibers are not bonded/fixed to one another but made freely movable. On the other hand, at the forward end portion S connected to a side of the base portion B opposing the substrate, optical fibers are integrally fixed to one another.

The length of the base portion B maybe determined desirably so long as the length is so sufficient that the optical fibers led out in the extension portion 10 can be pulled around freely with the base portion B as a turning portion when the optical fiber wiring board is assembled. When, for example, a standard optical fiber having a cladding with an outer diameter of 125 $\mu$m and a coating layer with an outer diameter of 250 $\mu$m is used so that an extension portion 10 can be constituted by about 4 to 8 optical fibers, the length of the base portion B may be preferably selected to be in a range of from about 30 mm to about 150 mm, preferably about 50 mm. If the length is not larger than 30 mm, there is a high possibility that excessive bending stress may be applied on the optical fibers when the optical fibers are curved. In this case, there is a tendency that curving characteristic is worsened particularly in a direction horizontal to the plane of the substrate 2. Further, the optical fibers are hardly bent because of their elasticity, so that stress is apt to be concentrated into an end portion of the optical fiber wiring board or into a portion in which optical fibers are fixed integrally. On the other hand, if the length is not smaller than 150 mm, the bundle of optical fibers led out lacks so-called firmness to bring about a tendency that buckling occurs because of slackening formed. In addition, there is a problem that the lengths of portions of optical fibers not fixed integrally are hardly equalized because slackening is apt to occur when the optical fibers are fixed integrally.

The following method is preferably used as means for fixing adjacent optical fibers integrally at the forward end portion S. For example, an alignment jig is used so that a plurality of optical fibers can be horizontally arranged closely in a row. The periphery of the optical fiber bundle is fixed by an adhesive agent to thereby form a coating layer. This method is preferred because steady fixation can be achieved easily and because the finished bundle can be handled as easily as a core wire tape. As other methods, there may be used a method in which an adhesive tape is stuck to a bundle of optical fibers lined up to thereby integrate the optical fibers. There may be also used a method in which adhesive materials are provided on the bundle of optical fibers and then chemical reaction, heat or light irradiation are applied on the bundle of optical fibers so that optical fibers are bonded relative to one another directly In the configuration, optical fibers at the forward end portion S are fixed integrally, for example, so as to be restricted in a row horizontally and form in a tape-like shape whereas adjacent optical fibers at the base portion B are set free. Accordingly, the extension portion 10 can be curved at the base portion B freely in a direction horizontal to the plane of the substrate 2. Further, the base portion B may be twisted so that the orientation of the connectors 3 can be adjusted in accordance with the equipment to be mounted.

Figure 8:
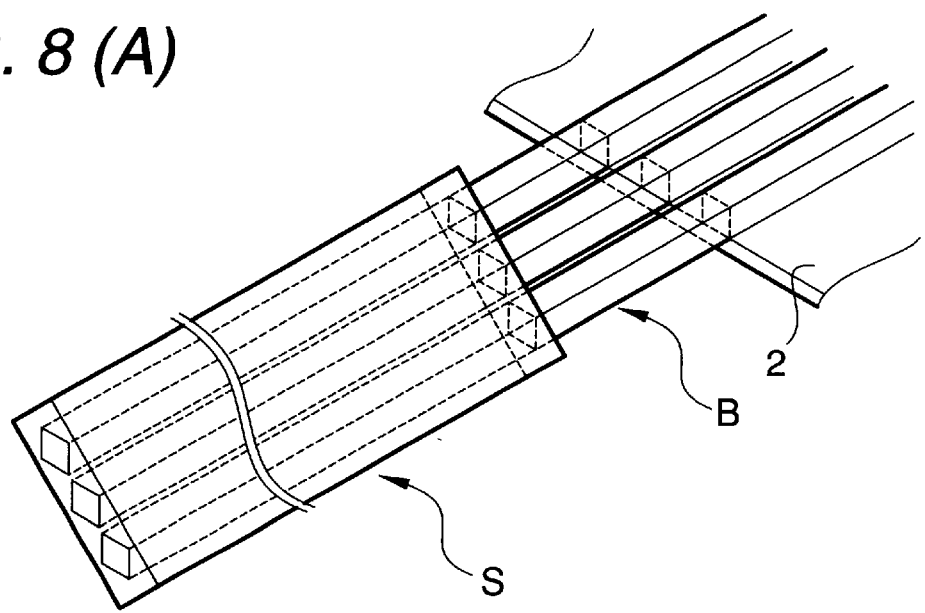
FIGS. 8A–C are perspective view, upper plane vice, side plane view respectively showing important part of optical fiber extension portions in which the close arrangement of optical fibers are twisted at 45° relative to the optical fiber leading-out direction.
Figure 8:
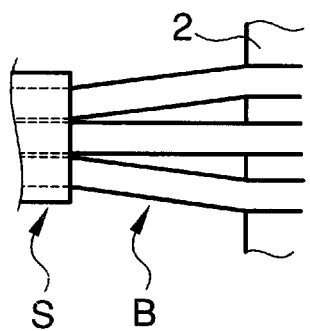
Figure 8:
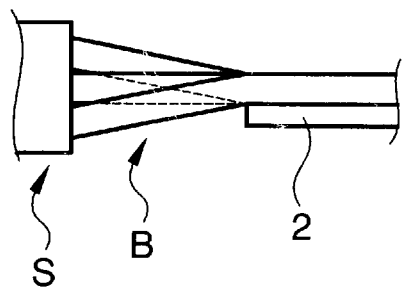

In the forward end portion S, the optical fibers may be fixed integrally in such a condition that a close arrangement where the optical fibers are closely arranged to one another is twisted, so that the connectors 3 can be further easily connected with the equipment-side connectors. For example, the close arrangement twisted with an angle of 45° relative to the optical fiber-leading out direction means that the optical fibers led out from the substrate in such a manner that the optical fibers are horizontally arranged closely in a row are arranged in the twisted portion in such a manner that the optical fibers are arranged closely in a row in a direction which has the angle of 45° relative to the optical fiber leading-out direction (as a state being non-parallel to the substrate) without changing a row order of the optical fibers and without twisting the optical fibers about its center axis in the longitudinal direction thereof as shown in FIGS. 8A–8C. Of course, other angles may be used in this embodiment. For explanation purposes, note that the cross-section of the optical fibers shown in FIGS. 8A–8C is depicted as rectangular rather than the more conventional circular shaped fibers.

Figure 7:
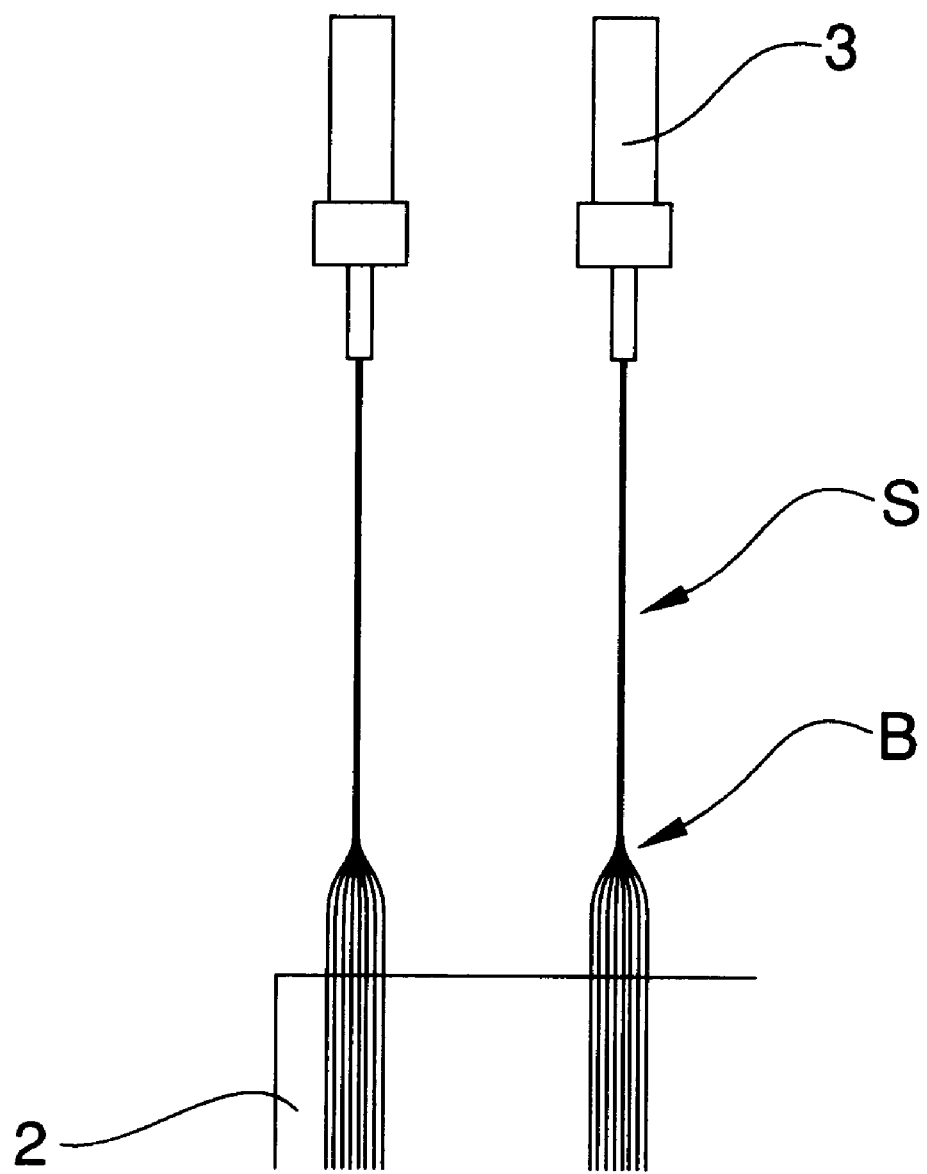
FIG. 7 is an enlarged plan view showing important part of optical fiber extension portions in which the close arrangement of optical fibers are twisted at 90° relative to the optical fiber leading-out direction.

In such configuration, the close arrangement of the optical fibers at the forward end portion S is twisted before fixed integrally, so that the optical fibers (or connectors) can be maintained in the proper orientation in the extension portions. In the integrally fixed portion, the close arrangement of the optical fibers is twisted; however, the optical fibers themselves are not twisted about respective center axes in the longitudinal direction. FIG. 7 is an enlarged, plan view showing the extension portion where the close arrangement of optical fibers is twisted at 90° relative to the optical fiber leading-out direction. In FIG. 7, the close arrangement of the optical fibers at the forward end potion is twisted at 90° relative to the optical fiber leading-out direction and then the optical fibers at the forward end portions are fixed integrally. Therefore, the connectors 3 are orientated at 90° relative to the plane of the substrate 2 from the position of FIG. 3. Hence, when the equipment-side connectors are oriented at 90° relative to the plane of the substrate 2, the optical fiber wiring board can be easily mounted on the equipment.

As mentioned above, in the present invention, as the optical fibers in the extension portions are freely oriented, even if the orientation of the connectors 3 needs to be adjusted in accordance with the equipment-side connectors, the optical fiber wiring board can be easily mounted on the equipment.

It is preferable that measures to reinforce mechanical strength and perform protection from external force are applied to the base portion B when the extension portion 10 is curved or twisted as described above because the base portion B is different from other portions in that no carrying material is provided at the base portion B.

Any one of various methods can be used as a method for protecting the base portion B. Examples of the method used in the invention include: a method of coating the base portion B with an elastic rubber or gel member; and a method of winding the base portion B with a tape loosely. A method of loosely putting a protective tube on optical fibers at the base portion B is, however, preferred from the point of view of excellent workability of attachment without limitation on free relative movement of optical fibers at the base portion B as much as possible.

Figure 4:
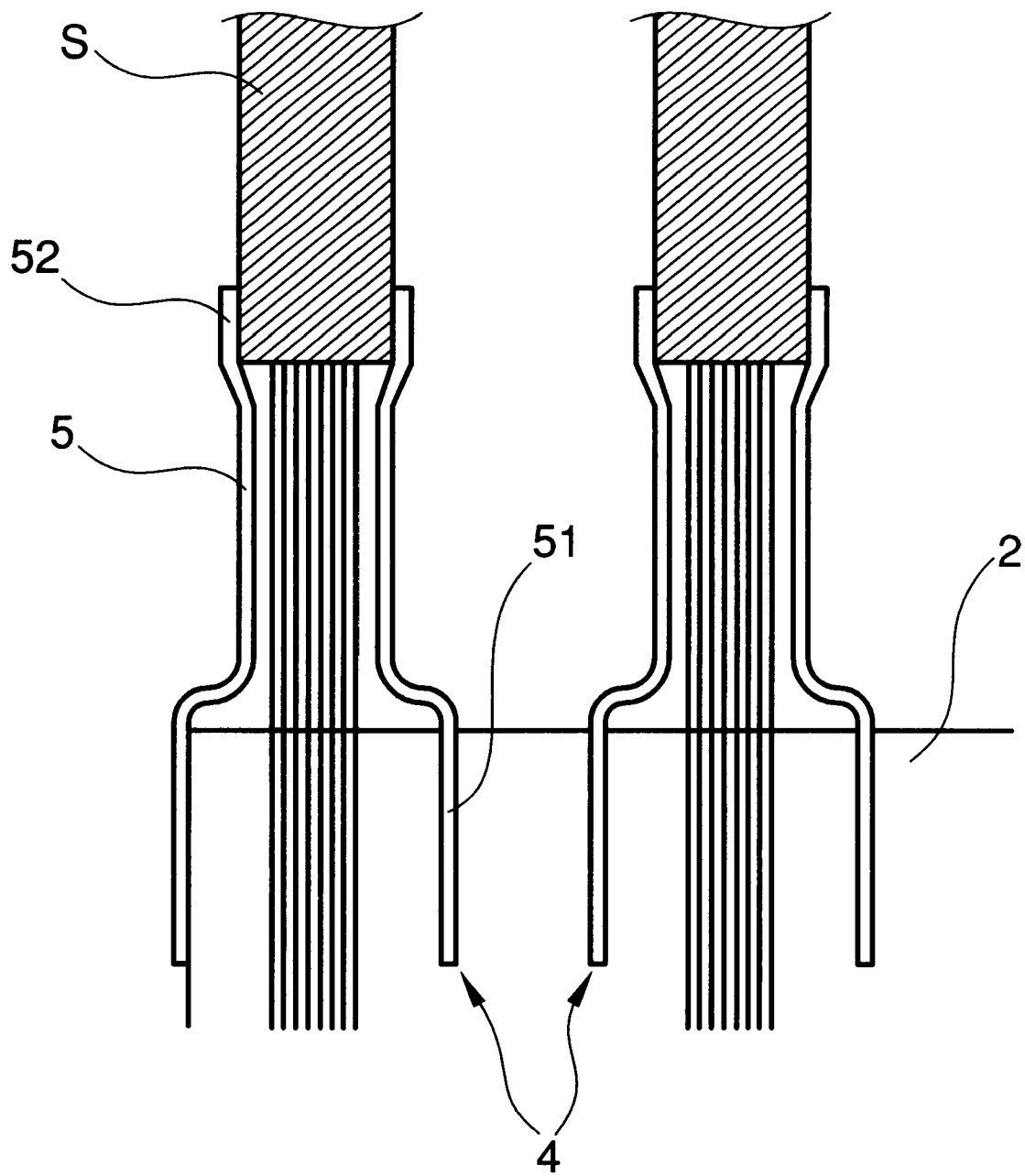
FIG. 4 is a partly sectional view showing a state in which optical fiber bundles are covered with protective tubes respectively;.

FIG. 4 shows an embodiment in the case where the base portion B is protected by the protective tube as described above. This embodiment shows the following example. The substrate 2 has notch portions 4 (see FIG. 3) which are located in opposite side portions between which the plurality of optical fibers are extended out from the edge portion of the substrate 2. One end portion 51 of the protective tube 5 is fitted and locked to the notch portions 4 (see FIG. 3). The other end portion 52 of the protective tube 5 is laid over the end portion side of the forward end portion S. According to this embodiment, workability is excellent because there is no need but a simple operation in which one end of the protective tube put on the optical fibers in the extension portion is attached into the notch portions 4 of the substrate before the connector 3 is attached to the forward end portion.

Examples of the protective tube 5 allowed to be used are various kinds of flexible tubes such as a heat-shrinkable tube, a rubber tube, a resin tube and a thin metal tube. Especially, the heat-shrinkable tube is preferred because it is tolerant to dropout as described above and because the portion locked to the substrate 2 can be made thin. Although groove-like notch portions 4 are shown as an example of the lock portion provided in the edge portion of the substrate 2, the invention is not limited thereto. For example, there may be used a method of providing a protruded portion on the substrate to thereby lock the tube or a method of heat-fusing the tube to the substrate as a heat seal.

When the force of leading out the protective tube is intended to be improved more greatly in the case where groove-like notch portions 4 shown in FIG. 3 are used as the lock portions, a structure may be used so that side walls of grooves of the notch portions 4 have unevenness surface such as the sawteeth. In this case, when a shrinkable tube is used as the protective tube 5, the tube is shrunk adhesively to the groove shaped like the sawteeth. Accordingly, tolerance to dropout is improved more greatly by the hooking effect of the groove shaped like the sawteeth. Such grooves can be machined by punching with a knife or laser machining.

Figure 5:
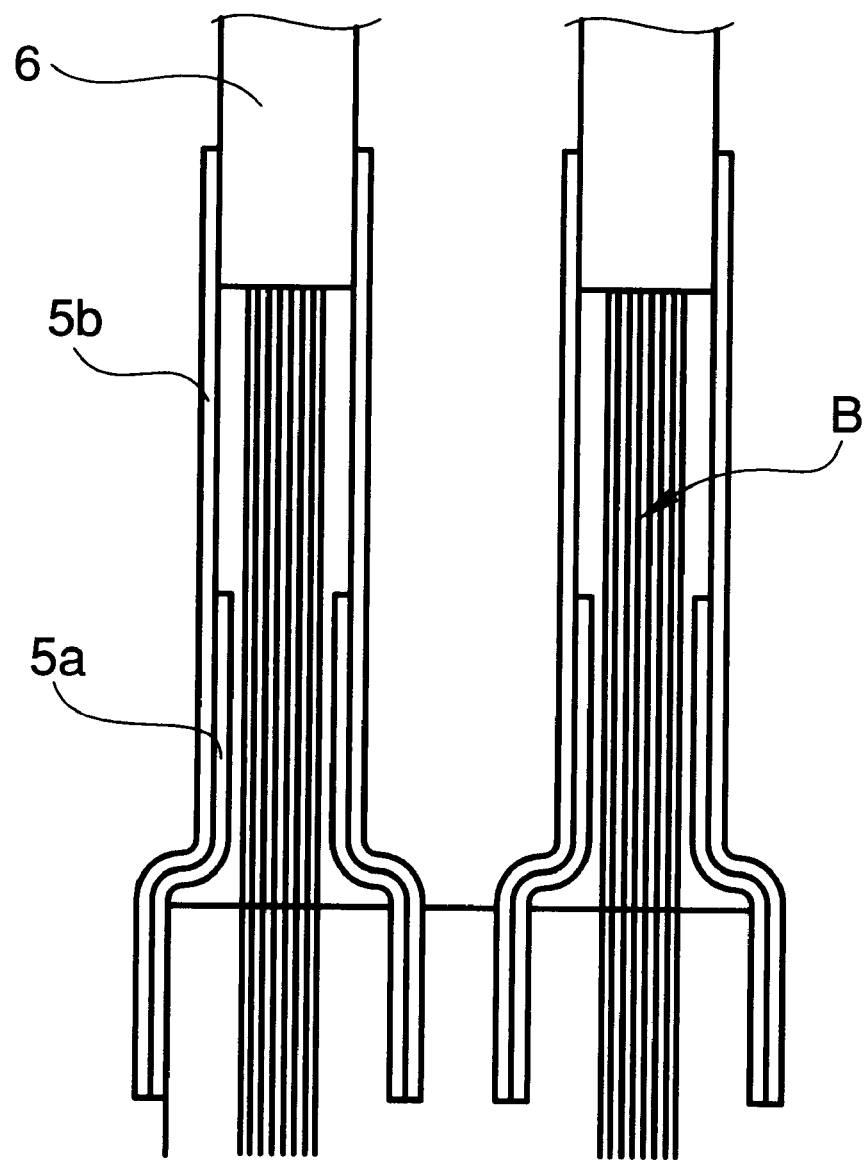
FIG. 5 is a partly sectional view showing a state in which optical fiber bundles are covered with double protective tubes respectively.

FIG. 5 shows a further embodiment of the invention. This embodiment is preferred in the case where a skin layer 6 is provided on optical fibers located at the forward end portion S of the extension portion 10. The skin layer 6, for example, is constituted by a combination of a reinforcing layer of a Kepler and a coating layer. In FIG. 5, the protective tube is provided as a double layer structure where the protective tube has a first and second protective tubes 5a, 5b. The first protective tube 5a protects the substrate 2 side of the base portion B. The second protective tube 5b covers the first protective tube 5a and covers the exposed portion of optical fibers reaching the skin layer 6.

Incidentally, in the optical fiber wiring board as described in the invention, optical fibers arranged as wiring on the substrate 2 may be covered with a protective sheet for the double purposes of: preventing wiring from being disordered; and protecting the optical fibers from being damaged.

Figure 6:
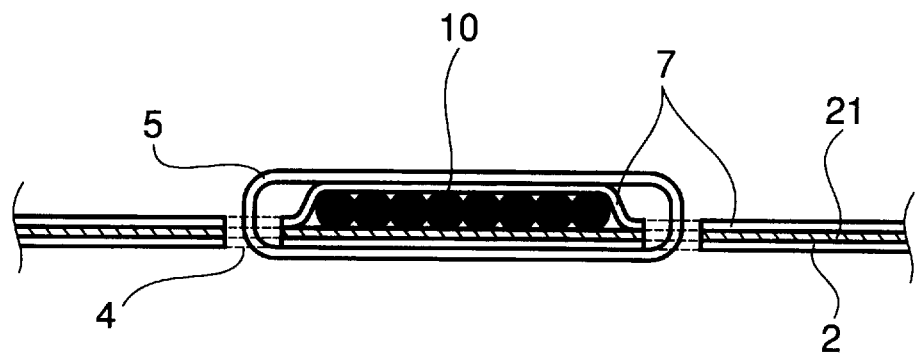
FIGS. 6A, 6B and 6C are sectional views showing optical fiber extension portions respectively.
Figure 6:
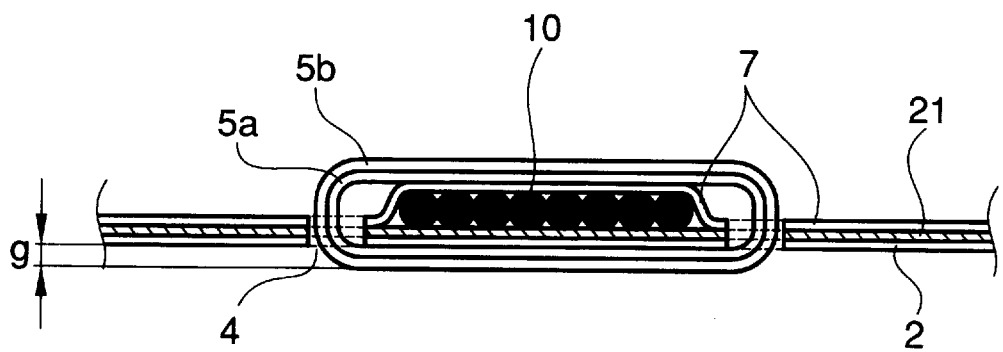
Figure 6:
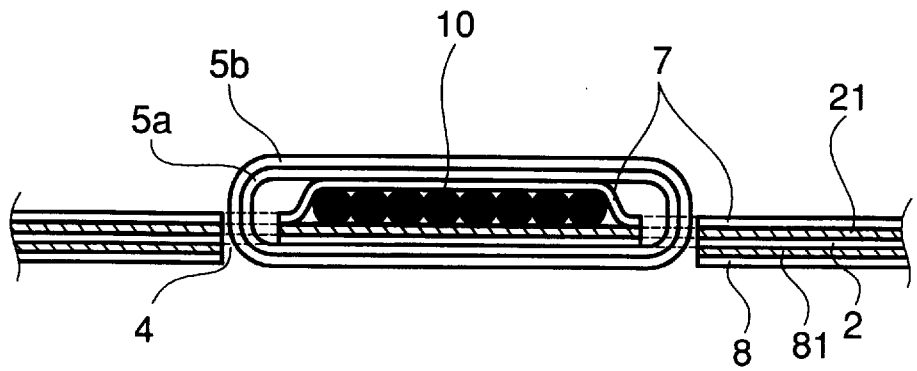

FIGS. 6A to 6C show an embodiment in which such a protective sheet is provided. FIG. 6A is a sectional view showing the case where the protective sheet 7 is provided by lamination when the single-layer protective tube 5 as shown in FIG. 4 is provided. The whole front surface of the substrate 2 is covered with the protective sheet 7 except that the protective sheet 7 is notched in the notch portions 4 in the same manner as that in the substrate. The protective tube 5 is provided so that the substrate 2 and the protective sheet 7 in the extension portion 10 of optical fibers are wrapped in the protective tube 5. Alternatively, the protective sheet 7 may be attached to the substrate 2 after the extension portion 10 is covered with the protective tube 5, so that the notch portions 4 and the extension portion 10 can be covered with the protective sheet 7 from above.

FIG. 6B is a sectional view showing the case where the protective sheet 7 is provided when the double-layer protective tubes 5a and 5b as shown in FIG. 5 are provided. Also in this case, the protective sheet 7 can be provided in the same manner as described above. It is, however, inevitable that the protective tube portion is thick relative to the substrate 2 because the tube has a double-layer structure with the first and second protective tubes 5a and 5b. For this reason, as shown in FIG. 6B, the level difference g between a portion with the extension portion 10 covered with the protective tube and the other portion becomes relatively large.

In the case where the generation of such a level difference g is to be avoided, that is, in the case where there is a fear of the disadvantage that workability is deteriorated by the presence of such a large level difference g because the level difference g is caught in the other portion when the optical fiber wiring board is incorporated in equipment, a height adjusting material 8 may be stuck to the rear surface of the substrate 2 through an adhesive layer 81 as shown in FIG. 6C so that the level difference g can be eliminated.

Besides the embodiments, the wiring form and the constituent materials of optical fibers can be selected suitably without departing from the gist of the invention. For example, the configuration in which the optical fiber wiring board is made fire-retardant as a whole by using fire-retardant materials as the substrate 2, the protective tube 5 and the protective sheet 7 is also a preferred embodiment.

As described above, in the optical fiber wiring board according to the invention, optical fibers led out from the substrate can be curved freely in a direction horizontal to the plane of the substrate as well as in a direction vertical to the plane of the substrate. Accordingly, the degree of freedom for pulling the optical fibers around can be increased when the optical fiber wiring board is incorporated in equipment and connected to the equipment by connectors. Hence, workability is excellent. Moreover, there is a merit that the degree of freedom for designing the equipment in which the optical fiber wiring board is incorporated is increased. Further, the optical fibers at the forward end portions are fixed integrally, for example, to form a tape-like shape, in such a condition that the close arrangement of the optical fibers is twisted. Accordingly, the bundle of the optical fibers led out from the substrate can be maintained with the proper orientation in accordance with the equipment to be mounted. In addition, the base portion of the optical fiber extension portion which is apt to be a mechanically weak point is covered with the protective tube so as to be reinforced. Hence, there is an excellent effect that tolerance to free pulling-around of the optical fibers can be guaranteed, While the presently preferred embodiments of the present invention have been shown and described, it is to be understood that this disclosure is for the purpose of illustration and that various changes and modifications may be made without departing from the scope of the invention as set forth in the appended claims

What is claimed is:

1. An optical fiber wiring board comprising:

a substrate;

a plurality of optical fibers arranged as wiring on said substrate; and extension portions separately formed from said substrate, and extending from said substrate, each of said extension portions including a base portion having a predetermined length from an edge portion of said substrate, and a forward end portion connected to a side of the base portion opposing said substrate;

wherein each of the extension portions includes some of said plurality of optical fibers disposed adjacent to one another, wherein said some optical fibers at the base portion are not fixed relative to one another whereas said some optical fibers at the forward end portion are fixed relative to one another integrally, and wherein the base portion is disposed directly adjacent to said edge portion of said substrate, wherein a portion of said edge portion, from which said extension portions extend, defines a straight edge for said substrate.

2. The optical fiber wiring board according to claim 1, wherein said some optical fibers in each of said extension portions are led out from said substrate closely to one another in a row in a horizontal direction, and wherein said some optical fibers at said forward end portion are integrated so that said some optical fibers are arranged adjacent to one another in a row.

3. The optical fiber wiring board according to claim 2, wherein said optical fibers at said forward end portion are integrated so that said some optical fibers are aligned in a tape-like shape and wherein the integrated optical fibers at said forward end portion are aligned non-parallel to the substrate.

4. The optical fiber wiring board according to claim 2, wherein said optical fibers at said forward end portion are integrated so that said some optical fibers are aligned in a tape-like shape and aligned non-parallel to the substrate while each of said optical fibers is not twisted about its center axis.

5. The optical fiber wiring board according to claim 1, further comprising:

a protective tube protecting at least at said base portion of each of said extension portions; and a lock portion provided in the edge portion of said substrate for locking one end portion of said protective tube relative to said substrate.

6. The optical fiber wiring board according to claim 5, wherein said lock portion includes notch portions formed at the edge portion of said substrate, between which said some optical fibers are extended out from the edge portion of said substrate, wherein said one end portion of said protective tube is fitted and locked to the notch portions.

7. The optical fiber wiring board according to claim 1, wherein further comprising: a skin layer covering said forward end portion of each of said extension portions; a first protective tube for protecting at least said base portion of each of said extension portions; a second protective tube for covering said first protective tube and covering an exposed portion of said plurality of optical fibers reaching said skin layer; and a lock portion provided in the edge portion of said substrate for locking one end portion of said first and second protective tubes relative to said substrate.

8. The optical fiber wiring board according to claim 5, wherein said protective tube includes a heat-shrinkable tube.

9. The optical fiber wiring board according to claim 7, wherein said first and second protective tubes include a heat-shrinkable tube.

10. The optical fiber wiring board according to claim 1, further comprising: an adhesive layer provided on said substrate.

* * * * *